P. B. DELANY.
TELEGRAPHY.
APPLICATION FILED MAY 22, 1905.
918,292.
Patented Apr. 13, 1909.
*Fig. 1.*
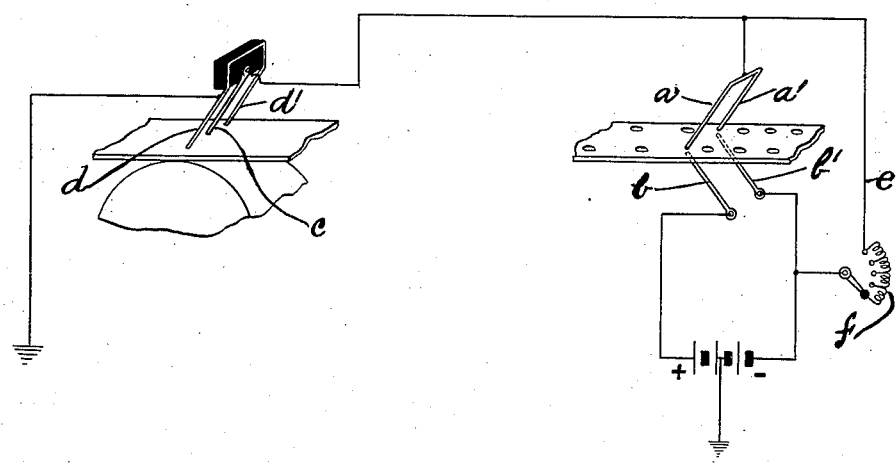
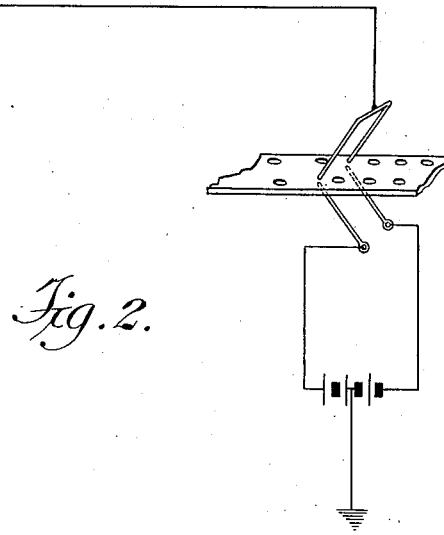
*Fig. 2.*

UNITED STATES PATENT OFFICE.

PATRICK B. DELANY, OF SOUTH ORANGE, NEW JERSEY, ASSIGNOR, BY MESNE ASSIGNMENTS, TO THE TELEPOST COMPANY OF MAINE.

TELEGRAPHY.

No. 918,292.　　　　Specification of Letters Patent.　　　Patented April 13, 1909.

Application filed May 22, 1905. Serial No. 261,523.

*To all whom it may concern:*

Be it known that I, PATRICK B. DELANY, a citizen of the United States, residing at South Orange, county of Essex, State of New Jersey, have invented certain new and useful Improvements in Telegraphy, of which the following is a specification.

This invention relates to electro chemical telegraphy, and is adapted for use in connection with that method of telegraphy disclosed in Letters Patent of the United States granted to me February 10, 1903, No. 720,004. In that system the capacity of the line is availed of to complete chemical reception of a signal after it has been initiated by a current of one polarity, the signal being terminated by a current of opposite polarity sent into the line at such interval after initiation of the signal as to cause the record of a dot or dash as the case may be.

In practical use of that system it has been found that the operation is highly satisfactory where the circuit is not exposed to disturbance due to induction or leakage from circuits carrying heavy currents; such as for electric light or power purposes. When the circuit is so exposed it has been found that there is more or less interference at the receiver with proper development of the record, electro-chemically, of the transmitted signals. Whether the marking current be positive or negative, extraneous currents of the same polarity however impressed upon the circuit impair perfection of the record produced at the chemical receiver. To neutralize or suppress such foreign currents I maintain on the line a neutralizing current of sufficient strength to overcome the foreign impulses without interfering materially with the signal impulses. If the current initiating the signal at the marking stylus be positive and the retardation of the line be relied upon to continue the record of the signal until terminated by a negative impulse, foreign currents on the circuit of positive sign tend to supplement the signal producing impulses and prolong the formation of the signal being recorded to such extent that it may merge into the record of the next signal transmitted and so obliterate in the record proper definition of the signals, and either render it unintelligible or impair it to such extent that it may not be read with suitable facility. To remedy this difficulty I maintain upon the circuit a current of polarity or sign opposite that of the signal marking current and of such strength as to neutralize the foreign marking current, so that its presence is not manifested in the record made upon the receiving tape. By suitable adjustment of the strength of the neutralizing current maintained on the line, the foreign current present is prevented from affecting the record of received signals.

To carry out this invention I connect to line, at any point, an adjustable source of electrical energy of suitable polarity. It may be one pole of the transmitting battery connected around the transmitting devices through a shunt of adjustable resistance; or the neutralizing battery may be placed at the receiver in an adjustable shunt around the recording styluses. The current so constantly impressed upon the line may, without material impairment of the signal impulses, be readily regulated in any given instance to neutralize the effect of foreign marking current impulses impressed upon the line so that the latter will not affect the record on the receiving tape. If the signal marking currents be positive the neutralizing current is negative and vice versa.

In the accompanying drawing: Figure 1 is a diagram showing the negative pole of the transmitting battery connected with the line through an adjustable shunt: Fig. 2 is a similar diagram showing connected to line the negative pole of a neutralizing battery in an adjustable shunt around the receiver.

$a, a'$ represents the upper pair of line connected transmitting contact fingers; and $b\ b'$ the coöperating lower pair, these fingers being adapted to make contact through the perforations of the transmitting tape, as shown in my Patent, No. 720,004.

$c$ is the marking stylus at the receiving end of the line and $d, d'$ the ground connected fingers which also run upon the chemically prepared tape. It may be assumed with reference to this illustration that the signal marking current is positive, or of a direction causing it to flow from the recording finger $c$. I, therefore, connect the negative pole of transmitting battery to line by a shunt $e$ containing an adjustable resistance $f$ of suitable size and fineness of adjustment.

In Fig. 2, a battery $l\ b$ is connected in a shunt around the recording fingers $c, d, d'$, and in this shunt is included a like adjustable resistance $f'$. The negative pole of the battery is to line.

I claim as my invention:

In electro chemical telegraphy, the process consisting in initiating the formation of signals at the receiver by transmitted marking currents of given polarity and uniform duration, utilizing the capacity of the line to complete said signals, terminating said signals by transmitted currents of reverse polarity and uniform duration, and maintaining upon the line at the receiving station during the foregoing operations a current of appropriate strength and of polarity the same as the signal terminating currents.

In testimony whereof, I have hereunto subscribed my name.

PATRICK B. DELANY.

Witnesses:
L. F. BROWNING,
EDWARD C. DAVIDSON.